(12) United States Patent
Shah et al.

(10) Patent No.: US 10,642,718 B2
(45) Date of Patent: May 5, 2020

(54) FRAMEWORK FOR TESTING DISTRIBUTED SYSTEMS

(71) Applicant: Nutanix, Inc, San Jose, CA (US)

(72) Inventors: Manan Hemantkumar Shah, San Jose, CA (US); Jagpreet Kaur Saigal, Sunnyvale, CA (US); Kilol Surjan, Fremont, CA (US)

(73) Assignee: NUTANIX, INC., San Jose, CA (US)

( * ) Notice: Subject to any disclaimer, the term of this patent is extended or adjusted under 35 U.S.C. 154(b) by 123 days.

(21) Appl. No.: 16/051,314

(22) Filed: Jul. 31, 2018

(65) Prior Publication Data

US 2020/0042432 A1    Feb. 6, 2020

(51) Int. Cl.
| | | |
|---|---|---|
| *G06F 11/36* | (2006.01) | |
| *G06F 11/34* | (2006.01) | |
| *G06F 11/263* | (2006.01) | |
| *G06F 11/273* | (2006.01) | |
| *G06F 9/50* | (2006.01) | |
| *G06F 9/455* | (2018.01) | |

(52) U.S. Cl.
CPC ...... *G06F 11/3672* (2013.01); *G06F 9/45558* (2013.01); *G06F 9/505* (2013.01); *G06F 9/5011* (2013.01); *G06F 11/263* (2013.01); *G06F 11/2733* (2013.01); *G06F 11/3414* (2013.01); *G06F 11/3664* (2013.01); *G06F 2009/45583* (2013.01); *G06F 2201/815* (2013.01)

(58) Field of Classification Search
CPC ............... G06F 11/3672; G06F 11/263; G06F 9/45558; G06F 9/5011; G06F 11/3414; G06F 11/2733; G06F 11/3664; G06F 2009/45583; G06F 2201/815; G06F 9/505
USPC .................................................. 717/100–135
See application file for complete search history.

(56) References Cited

U.S. PATENT DOCUMENTS

| | | | |
|---|---|---|---|
| 6,502,213 B1 * | 12/2002 | Bowman-Amuah | ........................ G06F 9/4492 714/49 |
| 7,958,509 B2 * | 6/2011 | Aridor | .................. G06F 9/5011 709/226 |
| 8,516,207 B2 * | 8/2013 | Li | ........................ G06F 11/2058 707/612 |
| 8,549,518 B1 | 10/2013 | Aron et al. | |
| 8,601,473 B1 | 12/2013 | Aron et al. | |
| 8,850,130 B1 | 9/2014 | Aron et al. | |
| 9,535,750 B1 * | 1/2017 | Wilkes | .................. G06F 9/4881 |
| 9,772,866 B1 | 9/2017 | Aron et al. | |
| 9,798,584 B1 * | 10/2017 | Kulkarni | ............... G06F 9/4881 |
| 10,228,962 B2 * | 3/2019 | Dornemann | ........ G06F 9/45558 |
| 2011/0270968 A1 * | 11/2011 | Salsburg | ............... G06F 9/5072 709/224 |

(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

*Primary Examiner* — Marina Lee
(74) *Attorney, Agent, or Firm* — Foley & Lardner LLP

(57) ABSTRACT

Disclosed is an improved approach to implement testing for distributed computing systems. A switchboard framework is provided that allows tests to be dynamically generated and executed against a system under test.

30 Claims, 13 Drawing Sheets

(56) References Cited

U.S. PATENT DOCUMENTS

| | | | | | |
|---|---|---|---|---|---|
| 2014/0047272 | A1* | 2/2014 | Breternitz | ............ | G06F 11/3495 714/32 |
| 2014/0180664 | A1* | 6/2014 | Kochunni | ............ | G06F 11/3442 703/21 |
| 2015/0074060 | A1* | 3/2015 | Varadharajan | ........ | G06F 16/188 707/609 |
| 2015/0341424 | A1* | 11/2015 | Nakashima | ............ | G06F 9/5061 709/201 |
| 2016/0011906 | A1* | 1/2016 | Chin | ........................ | G06F 9/485 718/104 |
| 2019/0087300 | A1* | 3/2019 | Bhimani | ..................... | G06F 8/36 |
| 2019/0087301 | A1* | 3/2019 | M | ........................ | G06F 11/3414 |
| 2020/0042432 | A1* | 2/2020 | Shah | ................... | G06F 11/3672 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Cano, Ignacio, et al. "Curator: Self-Managing Storage for Enterprise Clusters" (Mar. 27, 2017), from https://www.usenix.org/conference/nsdi17/.

* cited by examiner

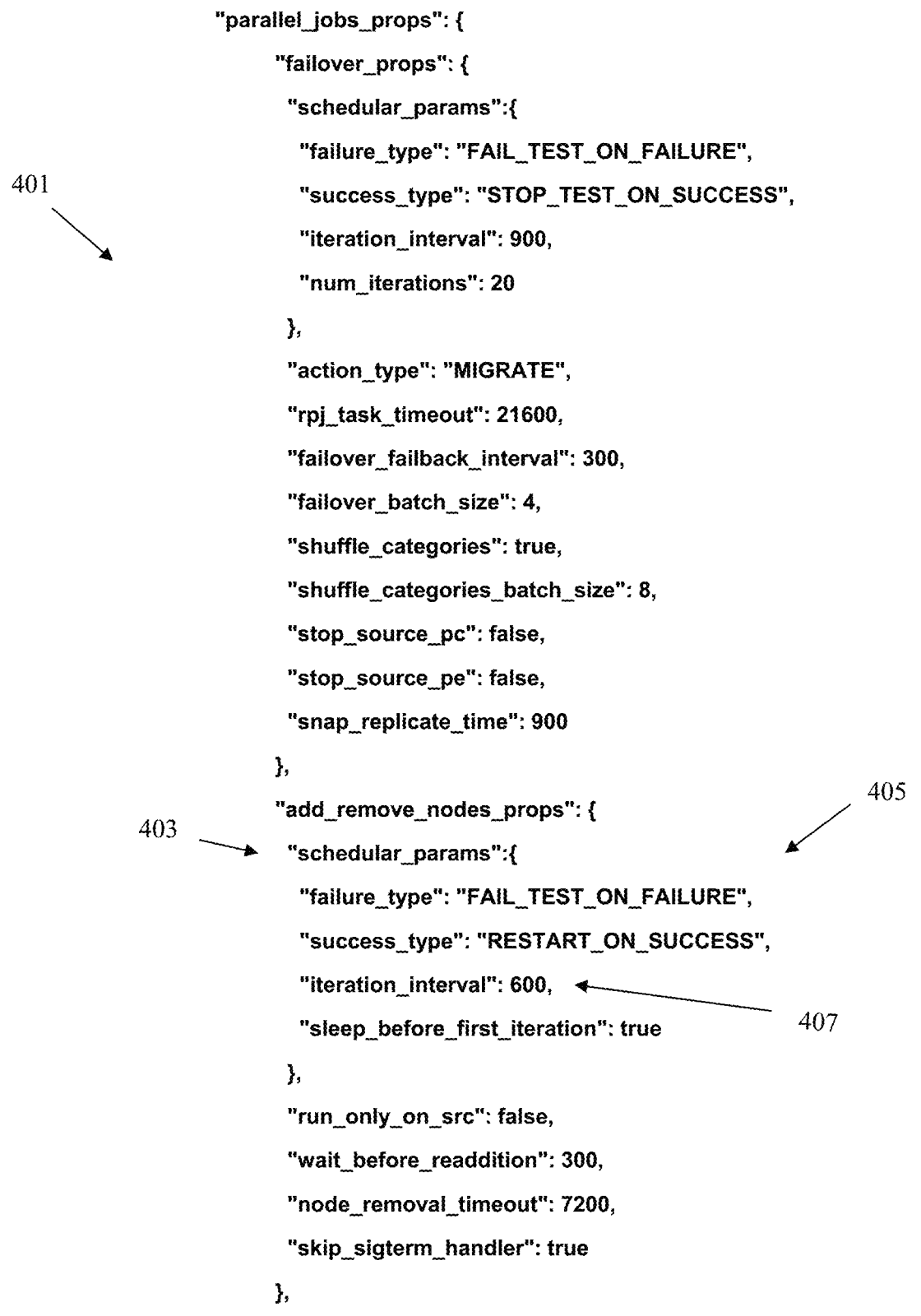

```
"parallel_jobs_props": {
    "failover_props": {
        "schedular_params":{
            "failure_type": "FAIL_TEST_ON_FAILURE",
            "success_type": "STOP_TEST_ON_SUCCESS",
            "iteration_interval": 900,
            "num_iterations": 20
        },
        "action_type": "MIGRATE",
        "rpj_task_timeout": 21600,
        "failover_failback_interval": 300,
        "failover_batch_size": 4,
        "shuffle_categories": true,
        "shuffle_categories_batch_size": 8,
        "stop_source_pc": false,
        "stop_source_pe": false,
        "snap_replicate_time": 900
    },
    "add_remove_nodes_props": {
        "schedular_params":{
            "failure_type": "FAIL_TEST_ON_FAILURE",
            "success_type": "RESTART_ON_SUCCESS",
            "iteration_interval": 600,
            "sleep_before_first_iteration": true
        },
        "run_only_on_src": false,
        "wait_before_readdition": 300,
        "node_removal_timeout": 7200,
        "skip_sigterm_handler": true
    },
```

401 → (failover_props block)
403 → "add_remove_nodes_props"
405 → (add_remove_nodes_props block)
407 → "iteration_interval": 600

Figure 4B-1

DR config:

"num_protection_rules": 4, ← 411

"protection_rule_config": { ← 413

"local_snapshot_count": 2, ← 415

"remote_snapshot_count": 2,

"rpo": 3600,

"snapshot_type": "CRASH_CONSISTENT" ← 417

},

"recovery_plan_count": 4, ← 419

"is_recovery_plan_multi_stage": true,

"recovery_plan_delay_between_stages": 60, ← 421

Figure 4B-2

```
"dr.draas.benchmark.test_draas_benchmark.DRaasBmarkTests.test_failove
r_onprem____ahv_si_dirn_migrate_host_migrations_v3_scoped_snapshots": {
    "test_args": {
        "parallel_jobs_switchboard": {
            "failover": true,
            "vm_host_migration": true,
            "v3_scoped_snapshots": true,
            "v2_vm_ops": false
        }
    }
}
```

FRAMEWORK FOR TESTING DISTRIBUTED SYSTEMS

BACKGROUND

Testing is an activity that is often performed to check the quality and functionality of software and hardware computing systems. Testing can be performed to accomplish any number of desired objectives. For example, testing may be performed to provide an objective view of whether a component or system under test meets its design and performance requirements, has stable performance, performs its activities within required timeframes, provides appropriate responses, and/or achieves acceptable performance results.

All software testing employs a strategy to select tests that are feasible for the available time and resources to apply to the system under test. A common approach is to create a set of static tests embedded with a pre-defined test cases that seek to explore the functionality of the system for those test cases. This approach is advantageous in that it provides a very targeted approach for checking on a specific set of conditions or outcomes that may be faced by the system being tested. However, what results from this process is typically a set of tests that limits the testing only to the fixed conditions imparted into the static tests. The static nature of these tests is therefore a very significant limitation upon the ability of the test to broadly cover a range of test conditions and circumstances. This limitation of static testing may be addressed by creating even more static tests that each address other test conditions, but this approach creates scaling problems as the number of static tests may quickly need to increase to very large numbers to reasonably cover an acceptable range of conditions and circumstances.

These problems are further exacerbated by the fact that modern computing systems may include many components and subsystems that are distributed across multiple networked nodes or computing clusters, and testing for this type of distributed system will necessarily involve processing in many configuration and operational variations that occur in complicated ways across the distributed system. For example, consider a distributed computing system that performs disaster recovery (DR) operations. Such DR operations involves activities to periodically back up data from a primary computing site to a secondary computing site, detect the presence of failures or problems, perform failover from the primary site to the secondary site upon detection of certain problems, and to perform failback once the primary site has sufficiently recovered. Proper testing of these types of DR operations will require the consideration of numerous system conditions, error conditions, workload conditions, and network/hardware/software configuration conditions that makes it virtually impossible to adequately perform testing in any sort of efficient, scalable, or comprehensive way with static tests.

Therefore, what is needed is an improved approach to implement testing for computing environments.

SUMMARY

Some embodiments of the invention are directed to an improved approach to implement testing for distributed computing systems. A switchboard framework is provided that allows tests to be dynamically generated and executed against a system under test. The switchboard framework decouples test implementation into multiple separate planes that allow flexibility in selecting and configuring workflow(s), which allows different tests to be generated in a dynamic manner.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIGS. 4A, 4B-1, 4B-2, and 4B-3 illustrate example configuration settings.

DETAILED DESCRIPTION OF THE EMBODIMENTS OF THE INVENTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material or characteristic described in connection with the embodiments is included in at least one embodiment. Thus, the appearances of the phrase "in some embodiments" or "in other embodiments", in various places throughout this specification are not necessarily referring to the same embodiment.

The present disclosure provides an improved approach to implement testing for distributed computing systems, where a framework is provided that allows tests to be dynamically generated and executed against a system under test. In particular, a switchboard framework (referred to herein as a "switchboard" or "framework"), which decouples test implementation into multiple separate planes that allow flexibility in selecting and configuring workflow(s), which allows different tests to be generated in a dynamic manner.

Figure 1:
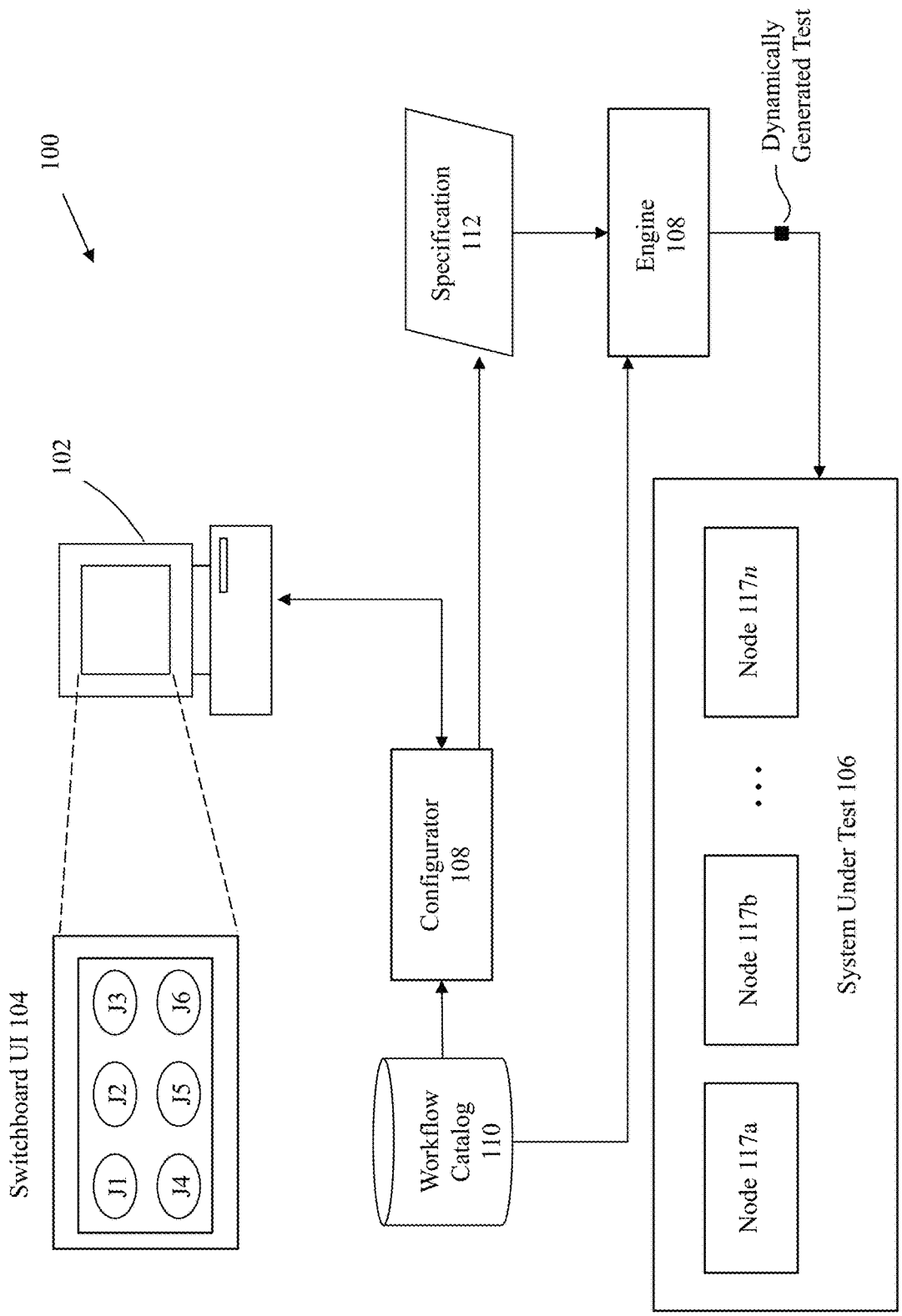
FIG. 1 illustrates a switchboard framework according to some embodiments of the invention.

FIG. 1 illustrates a switchboard framework 100 according to some embodiments of the invention. Framework 100 includes a workflow catalog 110 that provides a list of all possible workflows for the system under test 106. Each workflow within the workflow catalog comprises a distinct module that performs a separate type of workflow in the system. For instance, an example module in catalog 110 may pertain to a workflow that corresponds to performing software upgrades in the system. Another example module in catalog 110 may implement network or bandwidth throttling to implement network/bandwidth related stress in the system.

The general idea is that a user at user station 102 may be presented, through switchboard user interface (UI) 104, with a selection of items from the workflow catalog. The user can use UI 104 to pick and choose which of the workflows in the catalog 110 to select for testing purposes. The configurator 108 is operated to take the selected workflow items, along with other configured parameters, and to generate a test specification 112. The specification file 112 describes the profile of the SUT 106 and selected workflows from the workflow catalog 110.

The switchboard engine 108 uses the contents of the specification file 112 to dynamically generate tests that are applied to the system under test. The switchboard engine 108 includes an orchestrator component that translates the requirements from the specification file 112 to deploy the SUT 106 and manage the lifecycle of the workflows within the SUT 106. The switchboard engine 108 also includes a constraints resolver that checks for any incompatibilities for the configured workflows, and to generate the list of workflows for the SUT.

The system under test 106 is configured as specified by the user, and the workflows are then applied against the SUT to perform the testing. During and after the testing, validation may be performed to compute the quality of the SUT 106 when multiple apps/workflows are run in the test.

The crux of the design lies in the fact that the switchboard decouples the task of testing the system under test with selected variable workflows that can affect the system into two separate planes. The software tester selects the workflows (e.g., network bandwidth throttler, error injectors for components in SUT, etc.) to work with use cases of SUT resulting in different tests which are dynamic in nature.

Figure 2:
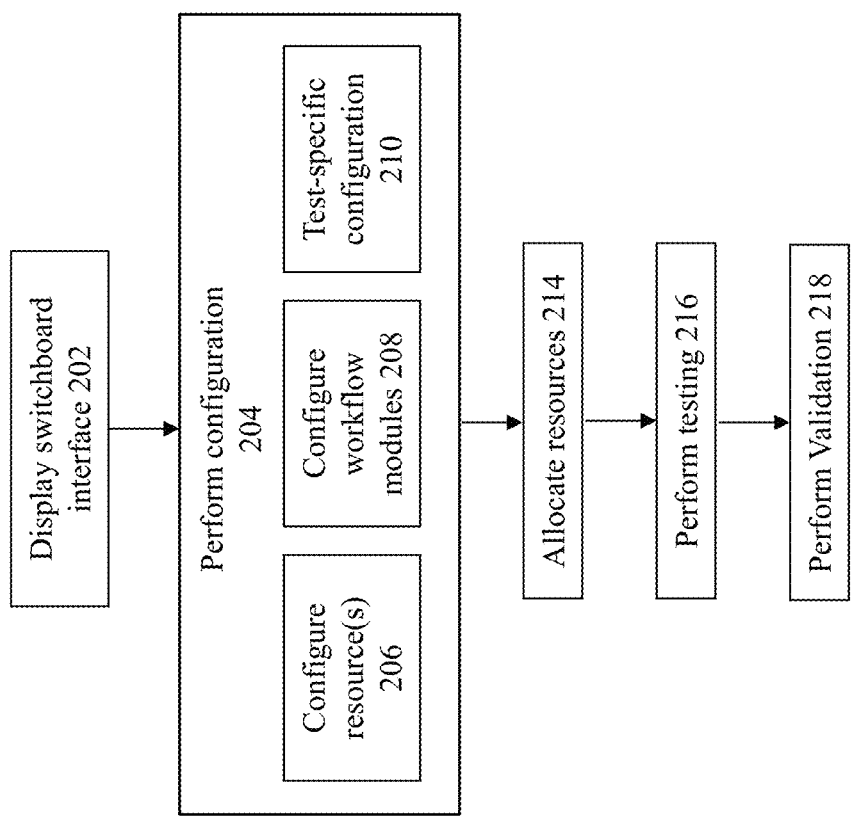
FIG. 2 shows a flowchart of an approach to implement some embodiments of the invention.
Figure 3:
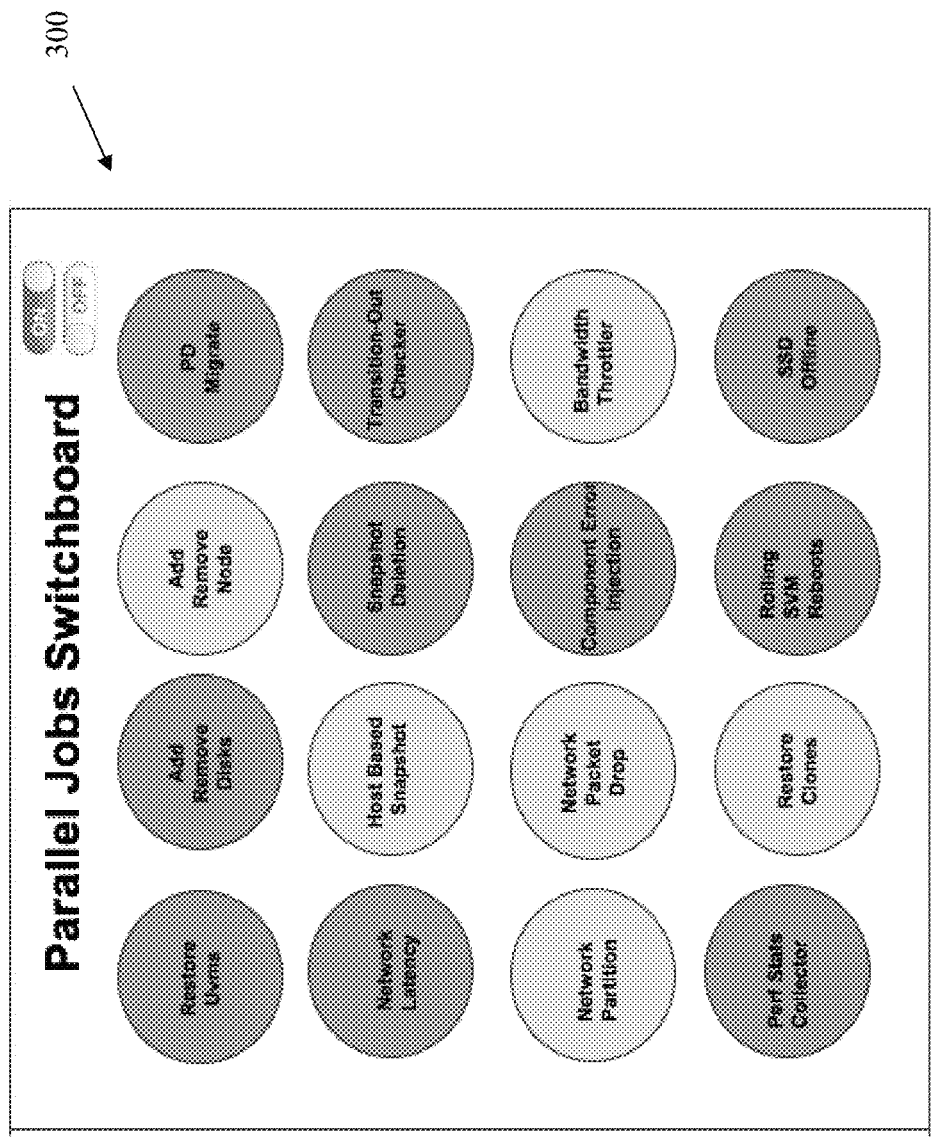
FIG. 3 shows an illustrative switchboard interface.

FIG. 2 shows a flowchart of an approach to implement some embodiments of the invention. At 202, a switchboard interface is presented to the user for selection of one or more workflows to utilize for testing purposes. FIG. 3 shows an illustrative switchboard interface 300 according to some embodiments, where the switchboard implements a framework akin to "app store", where one can select from any of the available jobs, and plug-in any combination of these jobs into the system tests. The jobs may be applied in parallel when implemented as a dynamic test. Thus, the switchboard may be referred to in some implementations as a "parallel jobs switchboard". In the example interface, the user specifies the jobs to be run by marking the respective jobs as "true".

The switchboard interface is populated from a list of jobs derived from the workflow catalog. Contributions may be made to the workflow catalog to add any type of job for which there may be a desire to include in workflow processing for testing. The contribution may occur by adding and defining a method for the new job in the appropriate object class within the job store. The job will correspond to an executable that can be applied to the system using attributes selectable by the user.

Figure 4A:
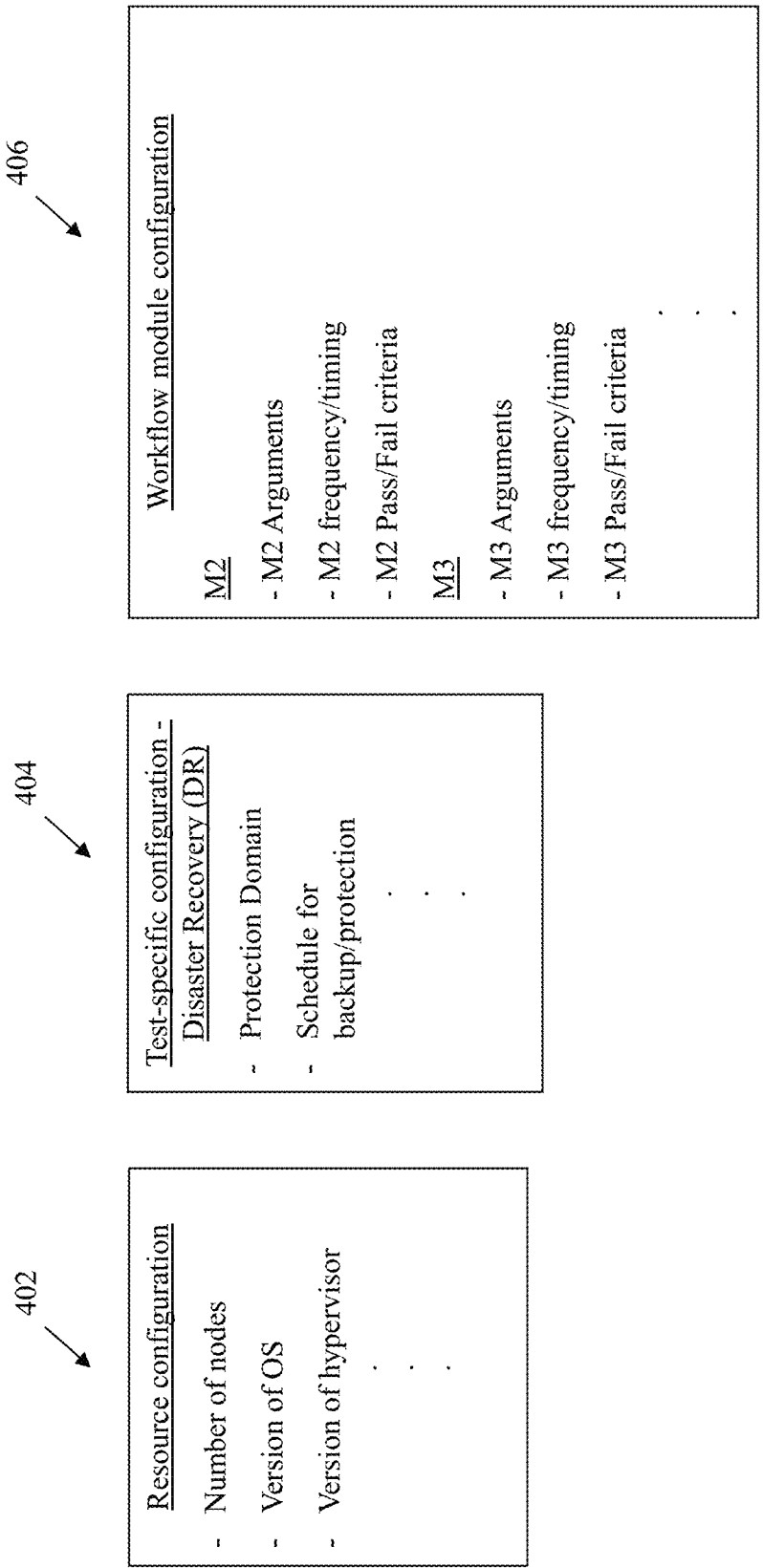

At 204 of FIG. 2, configuration may be performed by the user using the switchboard framework. At 206, configuration may be performed for the system resources to be tested. The general idea is that there is an actual set of hardware and software deployed into the field from which the user can have a choice of the specific combination and quantity of those resources to undergo tests. Therefore, step 206 is used to select the specific configuration of system resources to test. As shown in configuration 402 in FIG. 4, examples of system configuration options may include the number of nodes to run the testing on, the version of the operating system to test for management/controller entities (e.g., controller VMs or CVMs) on the nodes, and/or the version of the hypervisor to run on each node in a virtualized environment.

Figures 3, 4B:

At 208 of FIG. 2, configuration and selection may be performed on the workflow modules/jobs in the switchboard. This step is used to identify the specific jobs that are selected for testing. By way of illustration, this can be shown in configuration 406 of FIG. 4, which identifies modules M2 and M3 as the workflow jobs to be tested. Various configuration items may be set for each of the selected workflow jobs. For example, arguments and attributes may be provided for each of the selected modules. In addition, scheduling configurations (e.g., frequency and/or timing) may be set for the modules (e.g., run for 10 minutes every hour). Various pass/fail criteria may also be configured for the modules, to configure the circumstances in which testing involving that module may be considered as succeeding or failing. For example, a "failure type" may be configured to specific one of (a) FAIL_TEST_ON_FAILURE, (b) RESTART_ON_FAILURE, or (c) IGNORE_ON_FAILURE. A "success type" may specific one of (a) STOP_TEST_ON_SUCCESS, (b) RESTART_ON_SUCCESS, or (c) IGNORE_ON_SUCCESS. FIG. 4B-1 provides an illustration of an example configuration file 401 that may be created for workflow catalog configuration. This configuration file includes property information about selected workflow jobs selected for the testing, such as (a) attributes specific to a particular workflow; (b) scheduling parameters (403), (c) failure and success parameters (405), and/or (d) iteration parameters (407).

At 210 of FIG. 2, test-specific configurations may also be provided to the testing framework. These settings are specific to the type of tests to be performed. For example, consider the situation when testing is applied to disaster recovery operations in a distributed computing system. As illustrated in configuration 404 of FIG. 4A, some of the configuration settings that may be established specifically for the DR context may include configuration of "protection domains", which are defined groups of virtual machines to be backed up in a correlated manner for data consistency purposes. As another example in the DR context, configuration settings may be used to establish scheduling for backup/DR operations, such as the timing of when backups are taken of a consistency group. With regards to DR configuration, an example configuration is shown in FIG. 4B-2. This configuration file includes entries that pertain to, for example, configuration of protection rules (411), local snapshot counts (413), remote snapshot counts (415), recovery plan counts (417), information about single-stage or multi-stage recovery (419), and recovery plan delays between stages (421).

In some embodiments, switches corresponding to the workflows that can be turned on or off. For example, FIG.

4B-3 shows an illustrative test configuration 431 that has different switches being turned on/off, e.g., where the value "False" indicates the switch being turned off and the value "True" indicates the switch being turned on.

Figure 5:
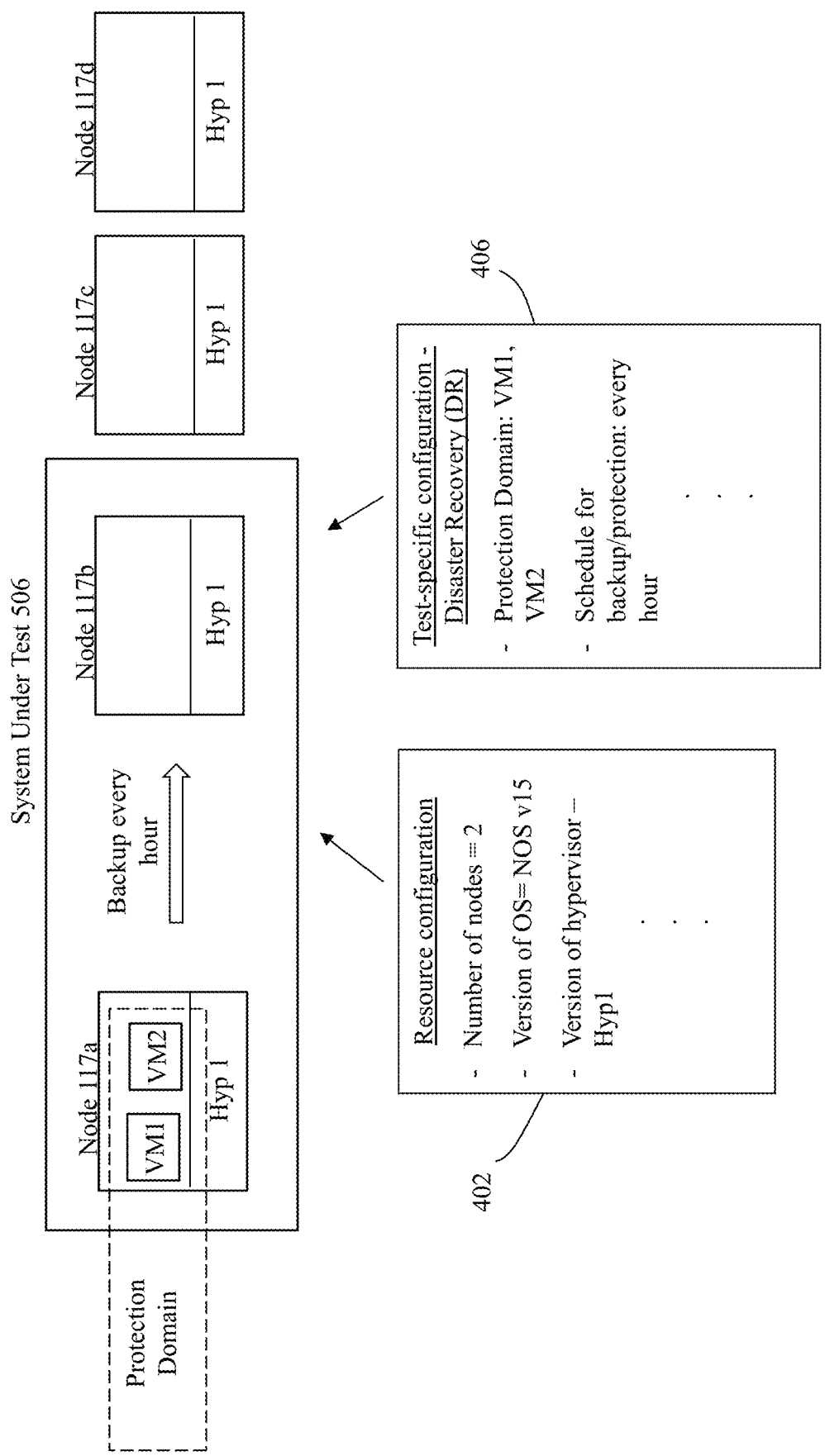
FIG. 5 illustrates resource configuration.

At step 214, the appropriate resources are allocated and configured based upon the test configuration file. This action is illustrated in FIG. 5, which shows a system under test 506 that is configured according to the configurations 402 and 404. For example, from among all of the nodes in the network (nodes 117*a-d*), configuration 402 may have specified a simple testing scenario to include just two nodes, which is allocated for testing in SUT 506 using nodes 117*a* and 117*b*. It is noted that this approach for allowing the user to specify the quantity of resources (e.g., nodes) permits a very flexible approach to testing, where testing can be stepped to different levels of resources usage to test the system under various conditions and resource allocation coverages. With regards to configuration 404 that specifies DR-specific configuration settings, an example setting may specific a protection domain having virtual machines VM 1 and VM 2 as members to be backed up on a schedule that occurs every hour.

At step 216, testing can then be performed on the system. In some embodiments, testing is performed by a process management utility that dynamically allocates processing resources to implementing the testing upon the SUT. This is accomplished by first reading the test specification that was previously constructed. Next, a check is made against the possible applications from the workflow catalog. For the possible applications, objects are then constructed for the selected jobs to be fed to allocated processes for execution within the system.

Figure 6:
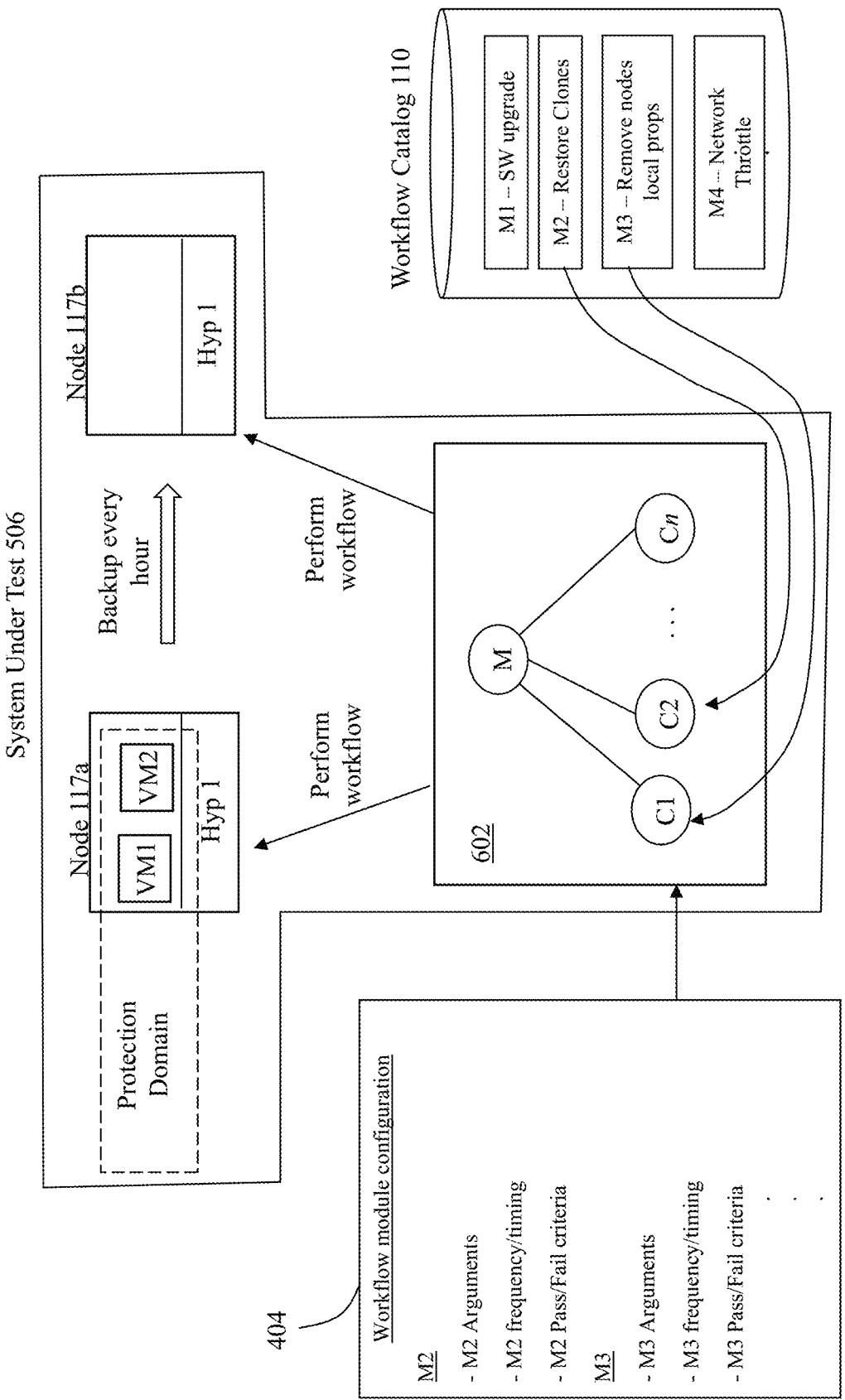
FIG. 6 shows an example system being testing.

FIG. 6 illustrates this this type of test processing. The process management utility 602 includes a master process M that manages the execution of multiple child processes C1, C2, . . . Cn. The configuration 404 is accessed to identify the specific test modules that had been selected through the switchboard interface, along with the configuration parameters that were set for those selected modules. Each of the selected modules are retrieved from the workflow catalog and configured with the appropriate parameters specified in the configuration 404. The configured objects corresponding to the selected modules are then assigned to respective child processes. For example, module M2 is assigned to child process C2 and module M3 is assigned to child process C1. It is noted that the process management utility 602 may be managing the regular work being handled by the system. Therefore, other child processes (e.g., Cn) may be processing the ordinary workload being handled in a conventional way within the system.

At this point, the testing proceeds by having the various child processes perform their respective workloads/jobs within the system. The regular DR workload becomes one of the child process amongst Cn. And in parallel, other workloads that have been selected to test/stress the system are being handled by child processes C1 and C2. The job schedules may be implemented as specified by the test configuration file for the selected jobs.

During the operation of these child processes, validation may occur to check the performance and quality of the SUT when the multiple apps/workflows are run in the testing situation (step 218). The configured pass/fail parameters can be employed to check whether the execution of the workflow modules result in successful pass conditions or failure conditions. Failure of the child process that is handling regular system workload would of course result in a test result that identifies a problem.

In an additional embodiment, a constraint resolver procedure may be employed to check for any incompatibilities between the selected workflow jobs. This is because certain of the workflow jobs may be incompatible with other jobs and/or have configuration parameters that may cause such incompatibilities. In some embodiments, a dependency graph may be employed to represent and track the dependencies between the workflows. Upon recognition of a conflict, some embodiments may issue an error and stop the testing procedure. In an alternate embodiment, a mapping structure can be maintained having defined conflict resolutions that can provided as a recommendation and/or automatically implemented to resolve the conflict.

In certain embodiments, auto-sizing may be implemented to resolve configuration inconsistencies and/or optimize configuration parameters. To explain, consider if the user provides a configuration that specifies a given number of nodes or VMs, while also specifying a required workload level (e.g., a specific input/output operations per second (TOPS) value/range). It may be the case that the specified number of nodes/VMs makes it impossible to achieve the specific TOPS values, either because too many nodes or too few nodes have been specified. In this situation, one or more of the specified parameters are scaled appropriately to achieve the highest-priority requested parameter. In the above example, assume that it is most desired to achieve the desired TOPS value for the workload, which means that auto-sizing would then be used to automatically adjust the number of nodes and/or VMs to meet the required IOPS level. On the other hand, if the number of nodes is most important to the user, then the specified TOPS value may be modified as required to meet the node requirements.

The above-described switchboard approach therefore provides a flexible framework that allows generation of complex tests via a very simple specification approach. This approach facilitates creation of innovative test cases where different workflows run together in distributed systems. This significantly reduces the amount of time required to qualify a SUT as the number of test cases are minimized. The outcome of employing such a system gives a definitive quality indicator of the product (SUT).

It is noted that the inventive concepts described herein may be applied to any type of computing system or application. By way of example, this disclosure will now describe an illustrative computing environment with which the invention may be applied. In particular, the inventive concepts may be illustratively used in a distributed virtualization system. With virtualization, the virtual machine refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer. Virtualization works by inserting a thin layer of software directly on the computer hardware or on a host operating system. This layer of software contains a virtual machine monitor or hypervisor that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them. Virtualization allows multiple virtual machines to run on a single physical machine, with each virtual machine sharing the resources of that one physical computer across multiple environments. Different virtual machines can run different operating systems and multiple applications on the same physical computer. One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Figure 7:
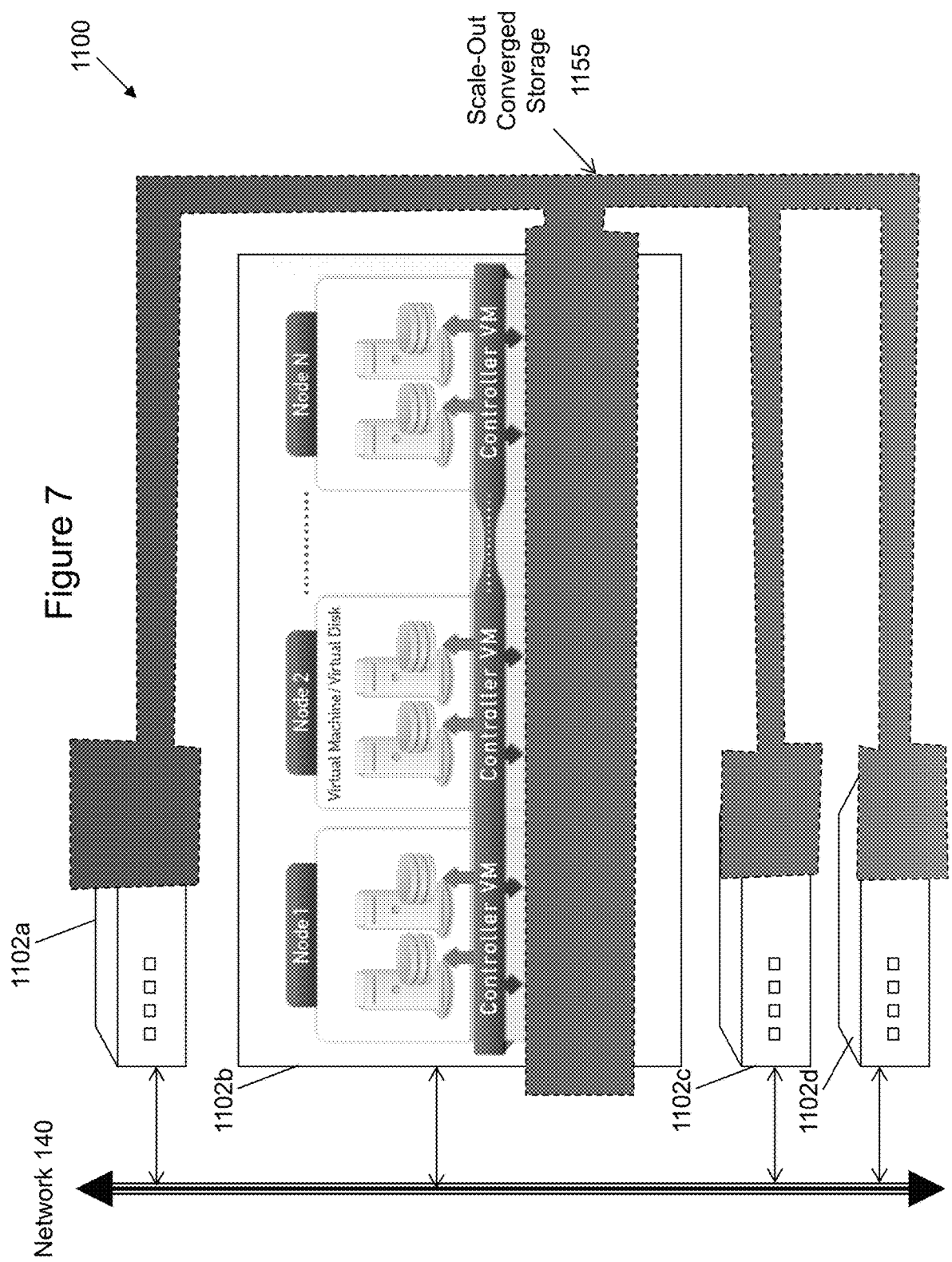
FIG. 7 shows an example storage architecture that can be used in a virtualization system.

FIG. 7 shows example architecture in which the invention may be applied for testing, where the testing is applied to a virtualization system having an integrated collection 1100 of virtualization appliances or "blocks" 1102a, 1102b, 1102c, and 1102d. Each of the blocks includes hardware and software to implement a virtualization solution. For example, block 1102b is internally organized to include hardware and software to implement multiple virtualization nodes. Each node runs a standard hypervisor on hardware that contains processors, memory and local storage, such as a mix of SSDs and/or hard disk drives. Each node runs virtual machines just like a standard virtual machine host.

In addition, local storage from all nodes is virtualized into a unified storage pool, which is referred to herein as "scale-out converged storage" or "SOCS" 1155. As described in more detail below, SOCS 1155 acts like an advanced SAN that uses local SSDs and disks from all nodes to store virtual machine data. Virtual machines running on the cluster write data to SOCS as if they were writing to a SAN. SOCS is VM-aware and provides advanced data management features. This approach brings the data closer to virtual machines by storing the data locally on the system (if desired), resulting in higher performance at a lower cost. As discussed in more detail below, this solution can horizontally scale from a few nodes to a large number of nodes, enabling organizations to scale their infrastructure as their needs grow.

While traditional SAN solutions typically have 1, 2, 4 or 8 controllers, an n-node system according to the present embodiment has n controllers. Every node in the cluster runs a special virtual machine, called a Controller VM (or "service VM"), which acts as a virtual controller for SOCS. All Controller VMs in the cluster communicate with each other to form a single distributed system. Unlike traditional SAN/NAS solutions that are limited to a small number of fixed controllers, this architecture continues to scale as more nodes are added. In embodiments of the invention, the management console interacts with the controller VMs to configure the SLA policies for storage components.

Figure 8:
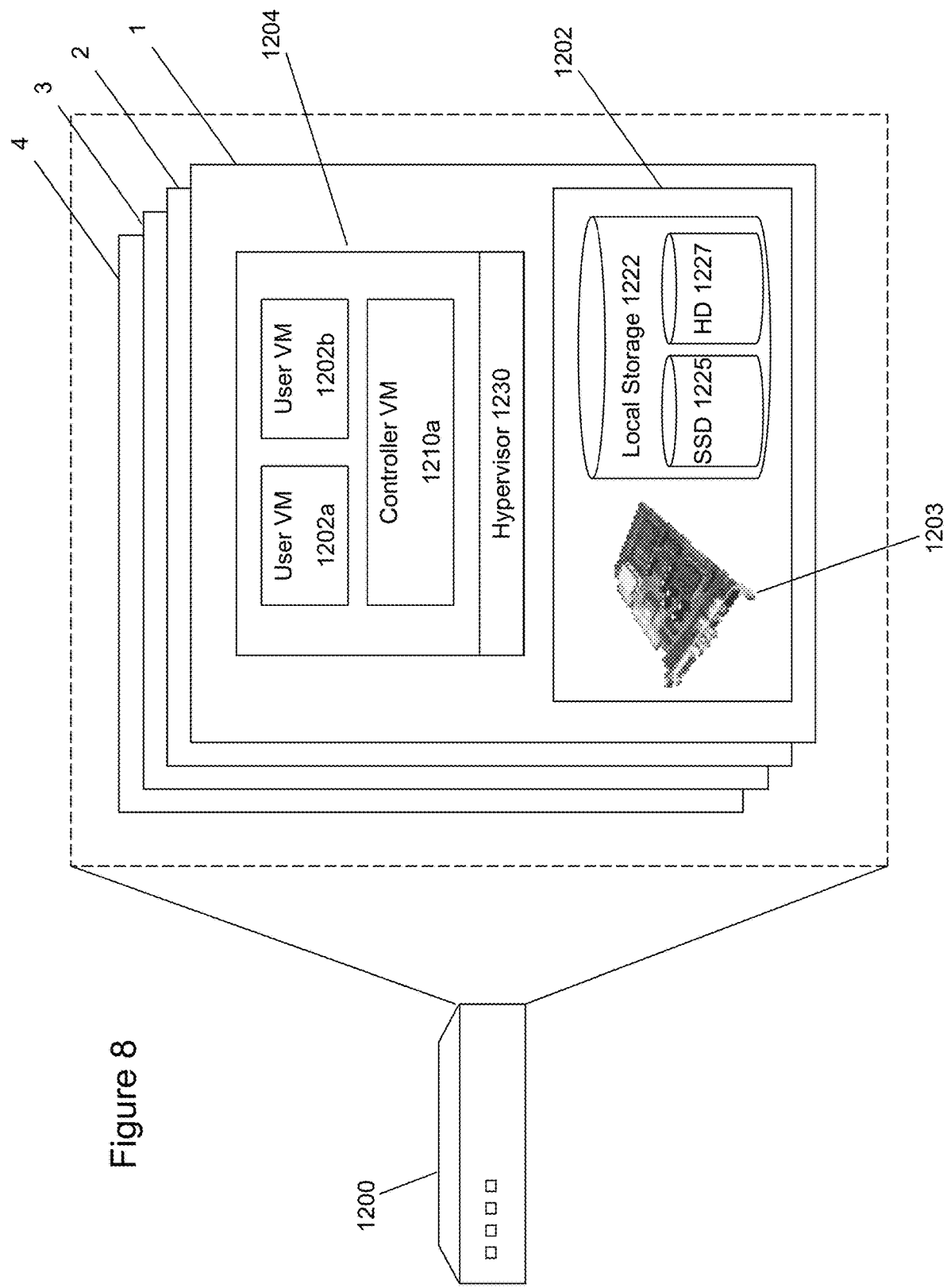
FIG. 8 illustrates a self-contained virtualization appliance.

As stated above, each block includes a sufficient collection of hardware and software to provide a self-contained virtualization appliance, e.g., as shown in FIG. 7. The example block 1200 in FIG. 8 includes four nodes 1-4. Having the multiple nodes within a block allows both high performance and reliability. Performance is increased since there are multiple independent nodes to handle the virtualization needs of the system. Reliability is improved since the multiple nodes provide for redundancy in the event of a possible hardware or software error. Moreover, as discussed below, the software-based storage management solution allow for easy movement of data as the storage needs of the system changes.

Each node in the block includes both hardware components 1202 and software components 1204 to implement virtualization. Hardware components 1202 includes processing capacity (e.g., using one or more processors) and memory capacity (e.g., random access memory or RAM) on a motherboard 1203. The node also comprises local storage 1222, which in some embodiments include Solid State Drives (henceforth "SSDs") 1125 and/or Hard Disk Drives (henceforth "HDDs" or "spindle drives") 1127. Any combination of SSDs and HDDs may be used to implement the local storage 1222.

The software 1204 includes a hypervisor 1230 to manage the interactions between the underlying hardware 1202 and the one or more user VMs 1202a and 1202b that run client software. A controller VM 1210a exists on each node to implement distributed storage management of the local storage 1222, such that the collected local storage for all nodes can be managed as a combined SOCS.

Figure 9:
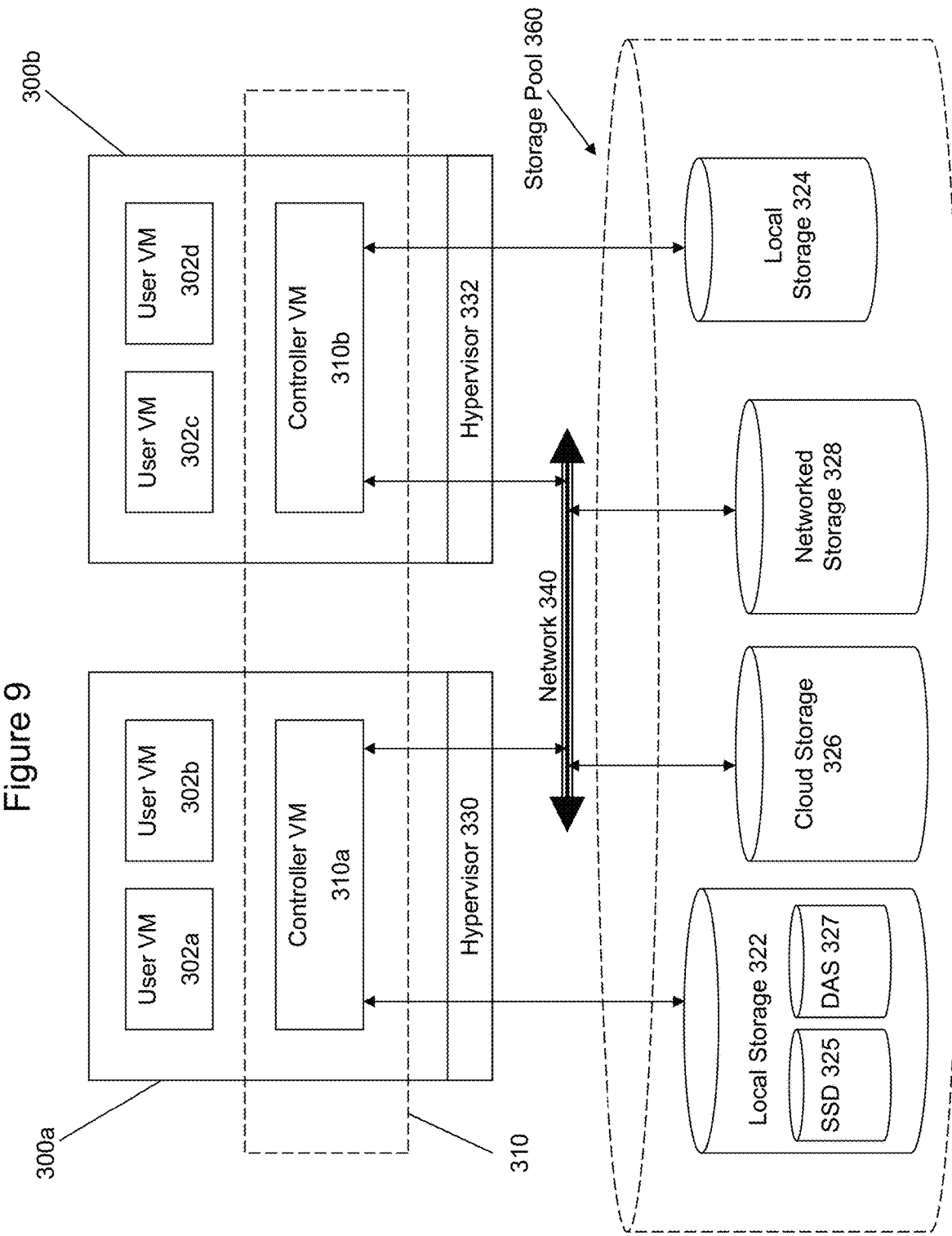
FIG. 9 illustrates an approach for implementing storage management in a virtualization environment according to some embodiments of the invention.

FIG. 9 illustrates an approach for implementing SOCS-based storage management in a virtualization environment according to some embodiments of the invention. The architecture of FIG. 9 can be implemented for a distributed platform that contains multiple nodes/servers 300a and 300b that manages multiple-tiers of storage. The nodes 300a and 300b may be within the same block, or on different blocks in a clustered environment of multiple blocks. The multiple tiers of storage include storage that is accessible through a network 340, such as cloud storage 326 or networked storage 328 (e.g., a SAN or "storage area network"). In addition, the present embodiment also permits local storage 322/324 that is within or directly attached to the server and/or appliance to be managed as part of the storage pool 360. As noted above, examples of such storage include any combination of SSDs 325 and/or HDDs 327. These collected storage devices, both local and networked, form a storage pool 360.

Virtual disks (or "vDisks") can be structured from the storage devices in the storage pool 360, as described in more detail below. As used herein, the term vDisk refers to the storage abstraction that is exposed by a Controller VM to be used by a user VM. In some embodiments, the vDisk is exposed via iSCSI ("internet small computer system interface") or NFS ("network file system") and is mounted as a virtual disk on the user VM. Each server 300a or 300b runs virtualization software, such as VMware ESX(i), Microsoft Hyper-V, or RedHat KVM. The virtualization software includes a hypervisor 330/332 to manage the interactions between the underlying hardware and the one or more user VMs 302a, 302b, 302c, and 302d that run client software.

Controller VM 310a/310b (also referred to herein as "service VMs") are used to manage storage and I/O activities. This is the distributed "Storage Controller" in the currently described architecture. Multiple such storage controllers coordinate within a cluster to form a single-system. The Controller VMs 310a/310b are not formed as part of specific implementations of hypervisors 330/332. Instead, the Controller VMs run as virtual machines above hypervisors 330/332 on the various nodes/servers 302a and 302b, and work together to form a distributed system 310 that manages all the storage resources, including the locally attached storage 322/324, the networked storage 328, and the cloud storage 326. Since the Controller VMs run above the hypervisors 330/332, this means that the current approach can be used and implemented within any virtual machine architecture, since the Controller VMs of embodiments of the invention can be used in conjunction with any hypervisor from any virtualization vendor.

Each Controller VM 310a-b exports one or more block devices or NFS server targets that appear as disks to the client VMs 302a-d. These disks are virtual, since they are implemented by the software running inside the Controller VMs 310a-b. Thus, to the user VMs 302a-d, the Controller VMs 310a-b appear to be exporting a clustered storage appliance that contains some disks. All user data (including the operating system) in the client VMs 302a-d resides on these virtual disks.

Significant performance advantages can be gained by allowing the virtualization system to access and utilize local (e.g., server-internal) storage 322 as disclosed herein. This is because I/O performance is typically much faster when performing access to local storage 322 as compared to performing access to networked storage 328 across a network 340. This faster performance for locally attached storage 322 can be increased even further by using certain types of optimized local storage devices, such as SSDs 325. Once the virtualization system is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 322. On the other hand, data that does not require fast access or which is accessed infrequently can be stored in the networked storage devices 328 or in cloud storage 326. In addition, the performance of the local storage can be further improved by changing the mix of SSDs and HDDs within the local storage, e.g., by increasing or decreasing the proportion of SSDs to HDDs in the local storage.

Figure 10:
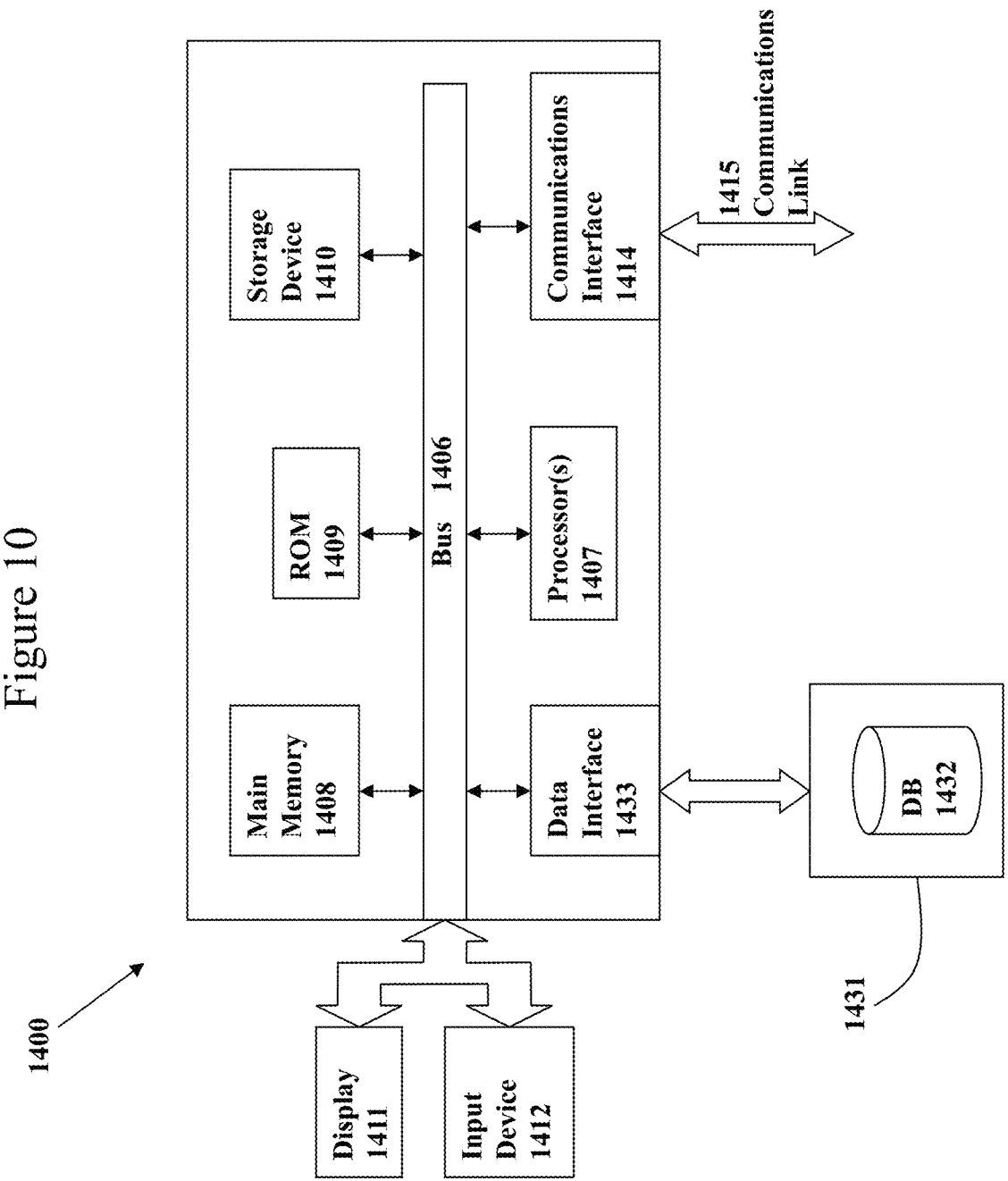
FIG. 10 is a block diagram of a computing system suitable for implementing an embodiment of the present invention.

FIG. 10 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method, comprising:
providing a switchboard interface that displays a plurality of test workloads from a workload catalog;
receiving from the switchboard interface a first configuration selection of a test workload to test from available jobs in the workload catalog;
receiving a second configuration selection of system resources to test, wherein the second configuration selection includes a configuration of a protection domain of virtual machines for disaster recover testing;
allocating system resources according to the second configuration selection to form a system under test;
executing the test workload to perform testing in the system under test including resolving configuration inconsistencies and optimizing configuration parameters; and
establishing scheduling times for when backups of the protection domain of virtual machines are done to achieve optimized configuration parameters.

2. The method of claim 1, further comprising generating a third configuration that corresponds to a test-specific configuration, the third configuration applied to configure the system under test or to configure execution of the one or more workloads to perform the testing in the system under test.

3. The method of claim 1, wherein the optimized configuration parameters include a specific input/output operations per second (TOPS) value.

4. The method of claim 1, wherein the first configuration selection for the test workload includes at least one of (a) attributes specific to a particular workflow; (b) scheduling parameters, (c) failure and success parameters, or (d) iteration parameters.

5. The method of claim 1, further comprising testing different levels of resources to test the system under test with different conditions and resource allocation coverages.

6. The method of claim 1, further comprising allocating processing entities to execute the test workload, wherein the processing entities are child processes managed by a master process.

7. The method of claim 1, wherein a constraint resolver procedure is applied to check for incompatibilities between selected workflow jobs.

8. The method of claim 7, wherein the incompatibilities between the selected workflow jobs are corrected by changing a size of configuration parameters.

9. The method of claim 1, wherein the system under test corresponds to a virtualization system having virtual machines and computing nodes configured using the first configuration.

10. A computer program product embodied on a non-transitory computer readable medium, the non-transitory computer readable medium having stored thereon a sequence of instructions which, when executed by a processor causes the processor to execute a method, the method comprising:
providing a switchboard interface that displays a plurality of test workloads from a workload catalog;
receiving from the switchboard interface a first configuration selection of a test workload to test from available jobs in the workload catalog;
receiving a second configuration selection of system resources to test, wherein the second configuration selection includes a configuration of a protection domain of virtual machines for disaster recover testing;
allocating system resources according to the second configuration to form a system under test;
executing the test workload to perform testing in the system under test including resolving configuration inconsistencies and optimizing configuration parameters; and
establishing scheduling times for when backups of the protection domain of virtual machines are done to achieve optimized configuration parameters.

11. The computer program product of claim 10, wherein the computer readable medium further includes instructions for generating a third configuration that corresponds to a test-specific configuration, the third configuration applied to configure the system under test or to configure execution of the one or more workloads to perform the testing in the system under test.

12. The computer program product of claim 10, wherein the optimized configuration parameters include a specific input/output operations per second (IOPS) value.

13. The computer program product of claim 10, wherein the first configuration selection for the test workload includes at least one of (a) attributes specific to a particular workflow; (b) scheduling parameters, (c) failure and success parameters, or (d) iteration parameters.

14. The computer program product of claim 10, wherein the testing is stepped to different levels of resources usage to test the system under test with different conditions and resource allocation coverages.

15. The computer program product of claim 10, further comprising processing entities to execute the test workload, wherein the processing entities are child processes managed by a master process.

16. The computer program product of claim 10, wherein a constraint resolver procedure is applied to check for incompatibilities between selected workflow jobs.

17. The computer program product of claim 16, wherein the incompatibilities between the selected workflow jobs are corrected by changing a size of one or more configuration parameters.

18. The computer program product of claim 10, wherein the system under test corresponds to a virtualization system having virtual machines and computing nodes configured using the first configuration.

19. A system, comprising:
a processor;
a memory for holding programmable code; and
wherein the programmable code includes instructions providing a switchboard interface that displays a plurality of test workloads from a workload catalog, wherein the instructions include:
receiving from the switchboard interface a first configuration selection of a test workload to test from available jobs in the workload catalog;
receiving a second configuration selection of system resources to test, wherein the second configuration selection includes a configuration of a protection domain of virtual machines for disaster recover testing;
allocating system resources according to the second configuration to form the system under test;
executing the test workload to perform testing in the system under test including resolving configuration inconsistencies and optimizing configuration parameters; and
establishing scheduling times for when backups of the protection domain of virtual machines are done to achieve optimized configuration parameters.

20. The system of claim 19, wherein the programmable code further comprises instructions for generating a third configuration that corresponds to a test-specific configuration, the third configuration applied to configure the system under test or to configure execution of the one or more workloads to perform the testing in the system under test.

21. The system of claim 19, wherein the optimized configuration parameters include a specific input/output operations per second (TOPS) value.

22. The system of claim 19, wherein the first configuration selection for the test workload includes at least one of (a) attributes specific to a particular workflow; (b) scheduling parameters, (c) failure and success parameters, or (d) iteration parameters.

23. The system of claim 19, further comprising processing entities to execute the test workload, wherein the processing entities are child processes managed by a master process.

24. The system of claim 19, wherein a constraint resolver procedure is applied to check for incompatibilities between selected workflow jobs.

25. A computer program product embodied on a non-transitory computer readable medium, the non-transitory computer readable medium having stored thereon a sequence of instructions which, when executed by a processor causes the processor to execute a method, the method comprising:

receiving a first configuration selection of a test workload to test from available jobs in a workload catalog;

receiving a second configuration selection of system resources to test, wherein the second configuration selection includes a configuration of virtual machine clusters for disaster recover testing;

allocating system resources according to the second configuration selection to form a system under test;

executing the test workload to perform testing in the system under test including resolving configuration inconsistencies and optimizing configuration parameters; and establishing scheduling times for when backups of the virtual machine clusters are done to achieve optimized configuration parameters.

26. The computer program product of claim 25, wherein the optimized configuration parameters include a specific input/output operations per second (TOPS) value.

27. The computer program product of claim 25, wherein the first configuration selection for the test workload includes at least one of (a) attributes specific to a particular workflow; (b) scheduling parameters, (c) failure and success parameters, or (d) iteration parameters.

28. The computer program product of claim 25, wherein the testing is stepped to different levels of resources usage to test the system under test with different conditions and resource allocation coverages.

29. The computer program product of claim 25, wherein a constraint resolver procedure is applied to check for incompatibilities between selected workflow jobs.

30. The computer program product of claim 29, wherein the incompatibilities between the selected workflow jobs are corrected by changing a size of one or more configuration parameters.

* * * * *